(12) United States Patent
Makarow et al.

(10) Patent No.: US 11,085,507 B2
(45) Date of Patent: Aug. 10, 2021

(54) CONTROL DEVICE AND ASSOCIATED PRODUCTION METHOD

(71) Applicant: Mahle International GmbH, Stuttgart (DE)

(72) Inventors: Eugen Makarow, Ludwigsburg (DE); David Moczko, Stuttgart (DE); Edgar Salfeld, Lichtenwald (DE); Florian Wetzel, Baltmannsweiler (DE)

(73) Assignee: Mahle International GmbH

( * ) Notice: Subject to any disclaimer, the term of this patent is extended or adjusted under 35 U.S.C. 154(b) by 0 days.

(21) Appl. No.: 16/612,301

(22) PCT Filed: May 9, 2018

(86) PCT No.: PCT/EP2018/061983
§ 371 (c)(1),
(2) Date: Nov. 8, 2019

(87) PCT Pub. No.: WO2018/206631
PCT Pub. Date: Nov. 15, 2018

(65) Prior Publication Data
US 2020/0378471 A1  Dec. 3, 2020

(30) Foreign Application Priority Data

May 10, 2017 (DE) .......................... 102017207929.0

(51) Int. Cl.
*F16H 1/20* (2006.01)
*H02K 11/215* (2016.01)
(Continued)

(52) U.S. Cl.
CPC ........... *F16H 1/203* (2013.01); *F16H 57/023* (2013.01); *F16H 57/039* (2013.01); *G01B 7/30* (2013.01);
(Continued)

(58) Field of Classification Search
CPC .......... F16H 1/203; F16H 1/16; F16H 57/023; F16H 57/039; H02K 11/215; H02K 7/1166; H02K 5/1675; G01B 7/30; G01D 5/145

See application file for complete search history.

(56) References Cited

U.S. PATENT DOCUMENTS 3,538,640 A  11/1970 Hayes et al.
3,992,956 A  11/1976 Fischer
(Continued)

FOREIGN PATENT DOCUMENTS

DE  2356209  5/1979
DE  19647139  5/1997
(Continued)

OTHER PUBLICATIONS

English abstract for DE-102010003044.
Englsh abstract for DE-102013110349.
English abstract JP-2016-133158.

*Primary Examiner* — Randell J Krug
(74) *Attorney, Agent, or Firm* — Fishman Stewart PLLC

(57) ABSTRACT

A control device may include an electric motor having a stator and a rotor with a driveshaft, an output shaft, a transmission having a worm drive with a worm and a worm wheel, and a drive axis of the drive shaft extending inclined to an output axis of the output shaft. The worm may be arranged non-rotatably and may mesh with the worm wheel, which may be rotatably arranged on the output shaft and non-rotatably connected to a first gear wheel, which may be rotatably arranged on the output shaft and may mesh with a second gear wheel, which may be rotatable about an intermediate axis extending parallel to the output axis and may be non-rotatably connected to a third gear wheel, which may be (Continued)

be rotatable about the intermediate axis and may mesh with a fourth gear wheel, which may be non-rotatably arranged on the output shaft.

23 Claims, 3 Drawing Sheets

(51) Int. Cl.
| | |
|---|---|
| *F16H 57/023* | (2012.01) |
| *F16H 57/039* | (2012.01) |
| *G01B 7/30* | (2006.01) |
| *G01D 5/14* | (2006.01) |
| *H02K 5/167* | (2006.01) |
| *H02K 7/116* | (2006.01) |
| *F16H 57/02* | (2012.01) |

(52) U.S. Cl.
CPC ........... *G01D 5/145* (2013.01); *H02K 5/1675* (2013.01); *H02K 7/1166* (2013.01); *H02K 11/215* (2016.01); *F16H 2057/02034* (2013.01)

(56) References Cited

U.S. PATENT DOCUMENTS

| | | | | |
|---|---|---|---|---|
| 4,369,387 A | * | 1/1983 | Haar | B60S 1/08 |
| | | | | 310/75 R |
| 5,345,834 A | * | 9/1994 | Hayashi | F16H 1/16 |
| | | | | 74/421 A |
| 5,832,780 A | | 11/1998 | Gallienne | |
| 5,875,681 A | * | 3/1999 | Gerrand | B60S 1/166 |
| | | | | 310/83 |
| 6,465,915 B1 | * | 10/2002 | Kerdjoudj | F16H 37/041 |
| | | | | 310/40 MM |
| 6,789,443 B1 | * | 9/2004 | Torii | E05F 15/697 |
| | | | | 74/425 |
| 8,201,478 B2 | * | 6/2012 | Ramirez, Jr. | H02K 5/10 |
| | | | | 74/606 R |
| 10,224,790 B2 | * | 3/2019 | Andrey | H02K 11/21 |
| 10,876,595 B2 | * | 12/2020 | Sugiyama | H02K 5/10 |
| 2002/0117917 A1 | | 8/2002 | Tascher et al. | |
| 2008/0172877 A1 | | 7/2008 | Leibold | |
| 2016/0241108 A1 | * | 8/2016 | Kimura | H02K 1/2753 |
| 2017/0070130 A1 | | 3/2017 | Andrey et al. | |

FOREIGN PATENT DOCUMENTS

| | | |
|---|---|---|
| DE | 10013785 | 10/2001 |
| DE | 10109278 | 9/2002 |
| DE | 102010003044 | 9/2011 |
| DE | 102013110349 | 3/2015 |
| JP | 2016-133158 | 7/2016 |
| WO | 02/095171 | 11/2002 |

* cited by examiner

CONTROL DEVICE AND ASSOCIATED PRODUCTION METHOD

CROSS-REFERENCE TO RELATED APPLICATIONS

This application claims priority to International Patent Application No. PCT/EP2018/061983, filed on May 9, 2018, and German Patent Application No. DE 10 2017 207 929.0, filed on May 10, 2017, the contents of both of which are hereby incorporated by reference in their entirety.

TECHNICAL FIELD

The present invention relates to a control device for mechanically actuating a component. In addition, the invention relates to a method for producing such a control device.

BACKGROUND

Such control devices can be used for example for actuating flaps in a fresh air system or in an exhaust system of an internal combustion engine. Likewise, such a control device can be used for actuating a valve. For example, such a control device can also be employed for actuating a waste gate valve or a variable turbine geometry with a turbine of an exhaust gas turbocharger. Here, electrical thermostats, exhaust flaps, acoustic flaps and bypass flaps are of particular importance.

A generic control device is known for example from DE 10 2013 110 349 A1. It comprises an electric motor having a stator and a rotor with driveshaft. Furthermore, an output shaft for rotatingly driving an actuator. The respective actuator can then be coupled to the component to be actuated in a suitable manner. Furthermore, the control device comprises a transmission which drive-connects the driveshaft with the output shaft and which comprises a worm drive with worm and worm wheel. For a compact configuration of the control device, the individual components are arranged so that a drive axis, about which the driveshaft is rotatable, extends perpendicularly to an output axis, about which the output shaft is rotatable.

In the known control device, the driveshaft carries a first gear wheel which meshes with a second gear wheel. This second gear wheel is non-rotatably connected to the worm of the worm drive. The worm in turn meshes with the worm wheel is non-rotatably connected to the output shaft.

SUMMARY

The present invention deals with the problem of stating an improved or at least another embodiment for such a control device, which is characterized in particular by a high control output at the actuator while a compact design is pursued at the same time. Apart from this, a method for producing such a control device is to be stated.

According to the invention, this problem is solved through the subjects of the independent claims. Advantageous embodiments are subject of the dependent claims.

The invention is based on the general idea of utilising the output shaft additionally for rotatably mounting at least one gear wheel in order to be able to integrate a further transmission stage in the transmission in a particularly compact manner. By way of this further transmission stage, the transmission ratio of the transmission can be significantly increased as a result of which it is possible to provide an increased output torque on the output shaft without the electric motor having to be designed with regard to an increased drive torque for this purpose. Accordingly, higher actuating torques can thus be accessed on the output shaft or on an actuator that may be connected to the same.

In detail, the invention proposes to arrange the worm non-rotatably with regard to the driveshaft, so that it meshes with the worm wheel which is arranged on the output shaft so as to be rotatable about the output axis. Insofar, the worm wheel forms a gear wheel that is rotatably mounted on the output shaft. The worm can be directly non-rotatably connected to the drive shaft. It is likewise conceivable to indirectly non-rotatably connect the worm to the drive shaft by way of a dock coupling or another positive-locking connection. Furthermore, the worm wheel is non-rotatably connected to a first gear wheel, which is likewise arranged on the output shaft so as to be rotatable about the output axis. Insofar, this first gear wheel represents a further gear wheel which is rotatably mounted on the output shaft. Furthermore, the first gear wheel meshes with a second gear wheel which is rotatable about an intermediate axis extending parallel to the output axis and is non-rotatably connected to a third gear wheel. The third gear wheel is also rotatable about the intermediate axis and meshes with a fourth gear wheel. This fourth gear wheel is now non-rotatably arranged on the output shaft. Thus, the fourth gear wheel represents the output of the transmission while the worm represents the input of the transmission. Altogether, a three-stage transmission is provided in this manner which realises a very high transmission ratio, so that the electric motor at high rotational speed and low torque can provide a low rotational speed with high torque as output on the output shaft. Important here is the dual utilisation of the output shaft on the one hand for the rotatable arrangement of the worm wheel and of the first gear wheel and on the other hand for the non-rotatable arrangement of the fourth gear wheel. The dual utilisation of the output shaft simultaneously results in a highly compact design.

Advantageously, the worm can be geometrically arranged between the output shaft and an intermediate shaft, which extends coaxially to the intermediate axis and on which the second gear wheel and the third gear wheel are arranged. In this way, the installation space on both sides of the worm is utilised as a result of which the control device is a highly compact construction.

Furthermore, the worm can be geometrically arranged between the second gear wheel and the fourth gear wheel. By way of this, the existing installation space is also skilfully utilised.

When the two embodiments mentioned above are combined with one another, a force path or torque path is guided about the drive shaft in a circumferential direction based on the drive axis, in order to couple the drive shaft to the output shaft via the transmission. By way of this, the control device is an extremely compact construction.

Here, a configuration in which the worm is geometrically arranged in a direction extending parallel to the output axis between the second gear wheel and the fourth gear wheel and is geometrically arranged between the output axis and the intermediate axis extending transversely to the output axis is advantageous.

Particularly advantageous is an embodiment, in which the drive axis is geometrically arranged in the middle between the output axis and the intermediate axis. By way of this it is possible to optionally arrange the worm wheel on the output axis or on the intermediate axis, so that it meshes with the worm in each case.

Provided that the abovementioned intermediate shaft extending coaxially to the intermediate axis is present, the same can be arranged non-rotatably so that the second gear wheel and the third gear wheel are rotatably arranged on the intermediate shaft. Alternatively to this it is likewise possible to rotatably arrange the intermediate shaft about the intermediate axis and to arrange the second gear wheel and the third gear wheel non-rotatably on the intermediate shaft.

Advantageous is an embodiment in which the worm wheel and the first gear wheel are formed by a first step-up gear wheel on which two gear wheel portions are integrally formed, which have different diameters and/or number of teeth and which form the worm wheel and the first gear wheel. By way of this, the transmission can be realised comparatively cost-effectively. Practically it can be provided that the first step-up gear wheel is arranged on the output shaft so as to be rotatable about the output axis, which simplifies the assembly and the production.

Another embodiment which is additionally or alternatively realisable proposes that the second gear wheel and the third gear wheel are formed by a second step-up gear wheel, on which two gear wheel portions are integrally formed, which have different diameters and/or numbers of teeth and which form the second gear wheel and the third gear wheel. A cost-effective production of the transmission is also favoured by this. Practically it can be provided that the second step-up gear wheel is rotatably arranged about the intermediate axis on an intermediate shaft extending coaxially to the intermediate axis. This facilitates assembly and manufacture.

Further simplifications for the production of the control device materialise when the first gear wheel and the third gear wheel have same modules, preferentially same numbers of teeth, in particular also same diameters. In addition or alternatively, the second gear wheel and the fourth gear wheel can have same modules, preferentially same numbers of teeth, in particular also same diameters. The module m is defined as the quotient of the gear wheel pitch p and pi Π: $m=p/\Pi$. Similarly but more descriptively, the module m is also defined as the quotient of the pitch circle diameter d and the number of teeth z: $m=d/z$.

Of particular advantage is an embodiment in which the first gear wheel, the second gear wheel, the third gear wheel and the fourth gear wheel have same modules. This simplifies the realisability of the transmission.

According to an advantageous embodiment, an angle of rotation sensor for determining a rotary position of the output shaft can be present. Here it is practically provided that this angle of rotation sensor is configured as Hall sensor and interacts with a permanent magnet that is non-rotatably arranged on the output shaft. In connection with a suitable control unit, the electric motor can then be operated specifically so that preset angles of rotation for the output shaft or for the respective actuator are adjustable.

Advantageously, a bearing sleeve can be present which is subdivided by an intermediate wall into a bearing chamber and a sensor chamber. The output shaft can now be rotatably mounted about the output axis in the bearing chamber with a shaft end comprising the permanent magnet. Practically, the Hall sensor can be arranged in the sensor chamber. By way of this, the bearing sleeve has a dual function since it mounts on the one hand the output shaft while it positions the Hall sensor on the other hand. At the same time, the Hall sensor is protected from ambient conditions that are present in the bearing chamber by the intermediate wall.

In another further development, the angle of rotation sensor can comprise a sensor part comprising the Hall sensor, which sensor part, transversely to the output axis, projects through a lateral opening formed on the bearing sleeve in the region of the sensor chamber into the sensor chamber, so that the Hall sensor is arranged in the sensor chamber. By way of this, the electrical installation of the angle of rotation sensor is simplified.

Furthermore, electrical contacts of the sensor part can be electrically conductively connected to electrical contacts of a lead frame which is embedded in the plastic of a housing wall of a housing of the control device. In this way the electrical connection of the angle of rotation sensor via the lead frame can be partly integrated in the housing of the control device. This measure supports the compact design of the control device and facilitates the assembly.

Advantageously, the sensor part can be situated on an inner side of the housing and accordingly be connected to the lead frame on the inner side of the housing. Again, the lead frame can have on an outside of the housing an electrical connection for electrically contacting the sensor part. Thus, the electrical contacting of the angle of rotation sensor can be realised particularly easily on the outside of the housing. The production of the control device is simplified by this.

Particularly practical is an embodiment in which the driveshaft or the worm is radially supported or mounted on a housing of the control device on one or two sides in an end region of the driveshaft or of the worm that is axially facing away or distant from the remaining electric motor. By way of this, the reaction forces between worm and worm wheel can be absorbed. In this case, "axial" relates to the axis of rotation of the electric motor.

The method according to the invention for mounting a control drive of the type described above comprises the following steps. Initially, the output shaft with fourth gear wheel non-rotatably attached thereto is inserted into a housing of the control device. Following this, the electric motor with the worm non-rotatably attached to the driveshaft is inserted in the housing. Following this, the worm wheel and the first gear wheel that is non-rotatably connected to the same is fitted onto the output shaft. Finally, the second gear wheel and the third gear wheel that is non-rotatably connected to the same is fitted to an intermediate shaft extending coaxially to the intermediate axis, wherein this intermediate shaft is likewise arranged in the housing. This intermediate shaft can be optionally inserted beforehand or only with the second and third gear wheel arranged thereon. Following this, a cover can be fitted onto the housing which comprises a bearing for the output shaft and a positioning place for the intermediate shaft. Provided that the angle of rotation sensor mentioned above is provided, the sensor part for example can be suitably mounted in the housing before inserting the output shaft.

Further important features and advantages of the invention are obtained from the subclaims, from the drawings and from the associated figure description by way of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description, wherein same reference numbers relate to same or similar or functionally same components.

BRIEF DESCRIPTION OF THE DRAWINGS

It shows, in each case schematically.

DETAILED DESCRIPTION

Figure 1:
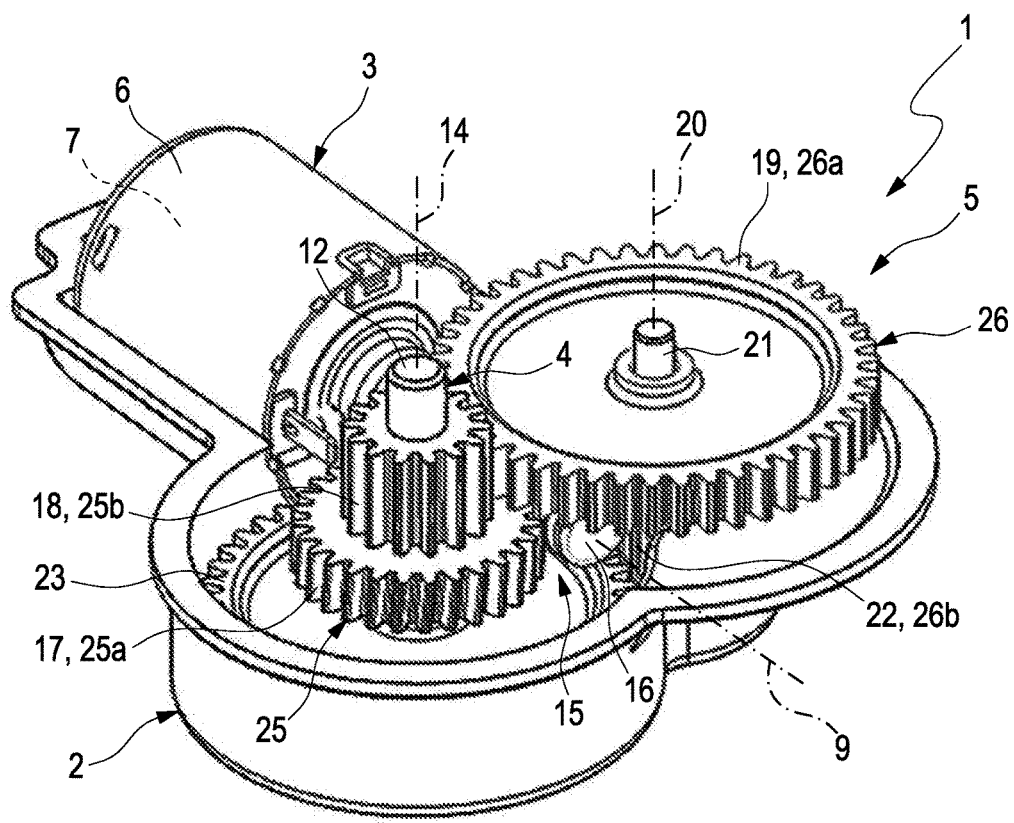
FIG. 1 an isometric view of a control device with opened housing.
Figure 2:
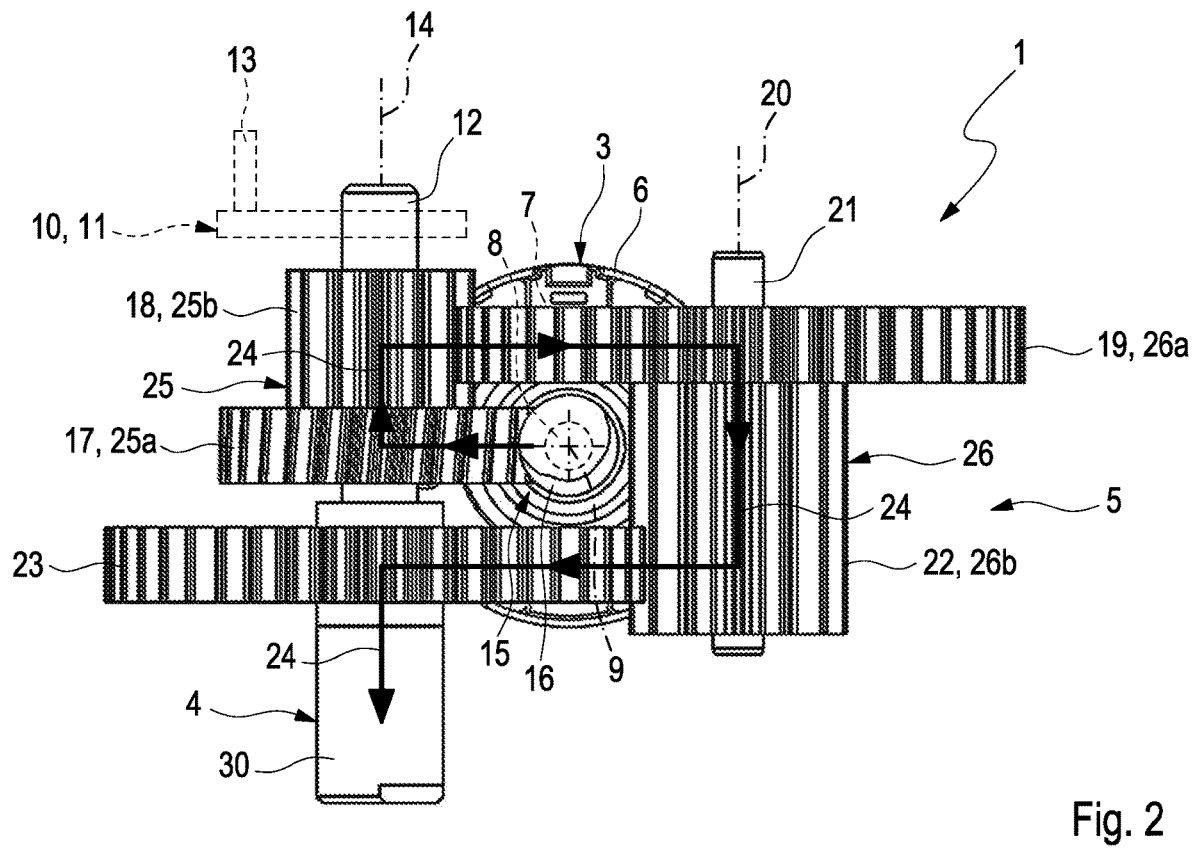
FIG. 2 a view of the control device without housing.
Figure 3:
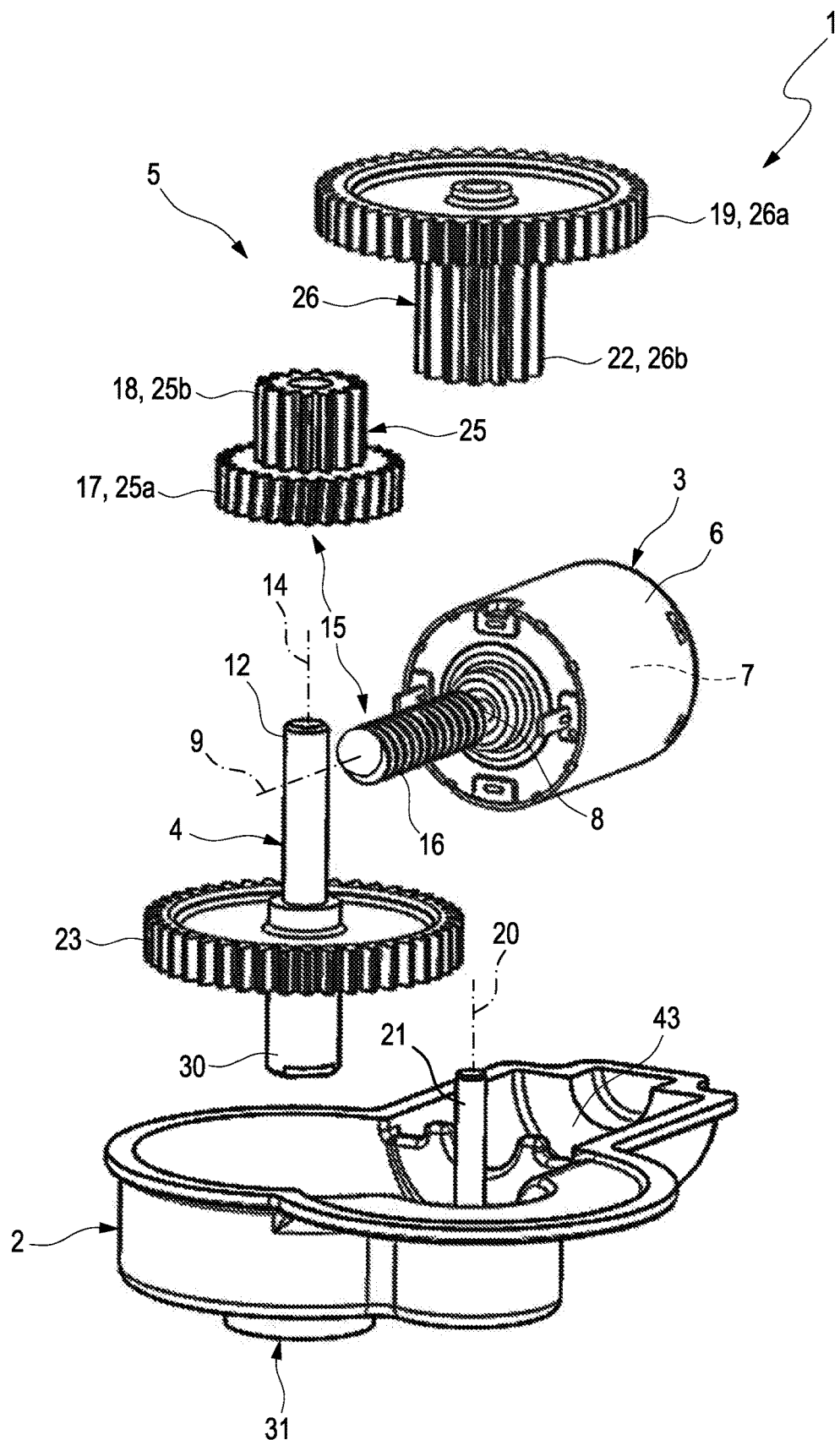
FIG. 3 an expanded isometric view of the control device with the open housing.

According to FIGS. 1 to 3, a control device 1, which is suitable for mechanically actuating a component that is not shown here, comprises a housing 2, which is only partly shown in FIGS. 1 and 3, an electric motor 3, an output shaft 4 and a transmission 5.

The electric motor 3 has a stator 6 located outside and a rotor 7 located inside with a driveshaft 8. The driveshaft 8 is rotatable about a drive axis 9. The output shaft 4 serves for the rotational driving of an actuator 10 indicated with dashed line only in FIG. 2, which can be coupled to the respective component to be actuated. Here, purely exemplarily, this actuator 10 is configured as actuating lever 11, which on an end 12 of the output shaft 4 led out of the housing 2 is non-rotatably arranged and, spaced apart from the output shaft 4, carries a pin 13, via which the coupling to the respective component to be actuated can be effected. The actuator 13 is practically arranged on an outside of the housing 2, when the housing is closed with a further housing part that is not shown here or with a cover. Here, the output shaft 4 is rotatable about an output axis 14. Here, the drive axis 9, with the control device 1 introduced here, is orientated substantially vertically to the output axis 14. Unclear inclined position between drive axis 9 and output axis 14 is conceivable, for example in order to reduce or exclude an axial loading of the worm wheel 17 introduced in the following.

The transmission 5 creates a drive connection between the driveshaft 8 and the output shaft 4. For this purpose, the transmission 5 comprises a worm drive 15 comprising a worm 16 and a worm wheel 17 which meshes with the worm 16. In the transmission 5 introduced here, the worm 16 is non-rotatably arranged on the driveshaft 8. For supporting the reaction forces from the engagement between worm 16 and worm wheel 17, the driveshaft 8 or the worm 16 can each be supported or mounted radially on the housing 2 of the control device 1 in a distant or spaced-apart end region that is axially facing away from the electric motor 3, which is not shown here.

The worm wheel 17 is rotatably arranged on the output shaft 4. Furthermore, the worm wheel 17 is non-rotatably connected to a first gear wheel 18. The first gear wheel 18 is likewise rotatably arranged on the output shaft 4. Furthermore, the first gear wheel 18 meshes with a second gear wheel 19 which is rotatable about an intermediate axis 20, which extends parallel to the output axis 14 and thus likewise substantially perpendicularly to the drive axis 9. Here, the intermediate axis 20 is defined by a longitudinal centre axis of an intermediate shaft 21 on which the second gear wheel 19 is arranged. Furthermore, the second gear wheel 19 non-rotatably connected to a third gear wheel 22, which is likewise arranged on the intermediate shaft 21 and rotatable about the intermediate axis 20. This third gear wheel 22 meshes with a fourth gear wheel 23 which is non-rotatably arranged on the output shaft 4.

The worm 16 is geometrically arranged between the output shaft 4 and the intermediate shaft 21. In particular, the drive axis 9 is geometrically arranged in the middle between the output axis 14 and the intermediate axis 20. Furthermore it is provided that the worm 16 is geometrically arranged between the second gear wheel 19 and the fourth gear wheel 23. In FIG. 2, a drive path 24 is indicated by arrows which symbolise the force transmission or torque transmission from the driveshaft 8 via the transmission 5 to the output shaft 4. Because of the arrangement of the individual components chosen here, the drive path 24, based on the drive axis 9 is guided roundabout the worm 16 in the circumferential direction, quasi spirally, in order to get from the driveshaft 8 or from the worm 16 as far as to the output shaft 4. Accordingly, a particularly compact design is realised here.

Apart from this, it is evident in FIG. 2 that the worm 16 is arranged parallel to the output axis 14, geometrically between the second gear wheel 19 and the fourth gear wheel 23, while transversely to the output axis 14 it is geometrically arranged between the output axis 14 and the intermediate axis 20.

Practically, the intermediate shaft 21 introduced above is non-rotatably arranged in the housing 2, for the purpose of which the housing 2 has a corresponding positioning place which is not shown here for inserting the intermediate shaft 21. Insofar, the intermediate shaft 21 is preferably non-rotatably arranged in the housing 2. Following this, the second gear wheel 19 and the third gear wheel 22 are rotatably arranged or mounted on the intermediate shaft 21. Basically, another embodiment is also conceivable, with which the second gear wheel 19 and the third gear wheel 22 are non-rotatably arranged on the intermediate shaft 21, while the intermediate shaft 21 in turn is rotatably mounted in the housing 2 about the intermediate axis 20.

In the examples shown here, the worm wheel 17 and the first gear wheel 18 are formed by a first step-up gear wheel 25, on which two gear wheel portions 25a and 25b are integrally formed. The two gear wheel portions 25a, 25b have different diameters and numbers of teeth. The one gear wheel portion 25a defines the worm wheel 17, while the other gear wheel portion 25b defines the first gear wheel 18. In the example, the first step-up gear wheel 25 is rotatably arranged on the output shaft 4.

Analogously to this, a second step-up gear wheel 26 is provided in the shown example in order to form the second gear wheel 19 and the third gear wheel 22. For this purpose, two gear wheel portions 26a and 26b are integrally formed on the second step-up gear wheel 26, which have different diameters and different numbers of teeth. The one gear wheel portion 26a defines the second gear wheel 19, while the other gear wheel portion 26b defines the third gear wheel 22. The second step-up gear wheel 26 is preferably rotatably arranged on the intermediate shaft 21 extending coaxially to the intermediate axis 20.

In the preferred embodiment shown here it is provided that the drive axis 9 is geometrically arranged in the middle between the output axis 14 and the intermediate axis 20. By way of this it is possible to rotatably arrange the first step-up gear wheel 25 also on the intermediate shaft 21 in such a manner that the worm wheel 17 meshes with the worm 16. Furthermore, the drive axis 9 practically stands perpendicularly on a plane in which the output axis 14 and the intermediate axis 20 extend.

In the example shown here, the first gear wheel 18 and the third gear wheel 22 have the same diameter and the same number of teeth. Insofar, the first gear wheel 18 and the third gear wheel 22 have the same module. Likewise, the second gear wheel 19 and the fourth gear wheel 23 have the same diameter and the same number of teeth. Insofar, the second gear wheel 19 and the fourth gear wheel 23 have the same module. Practically it is provided that the first gear wheel 18, the second gear wheel 19, the third gear wheel 22 and the fourth gear wheel 23 have the same module.

Figure 4:
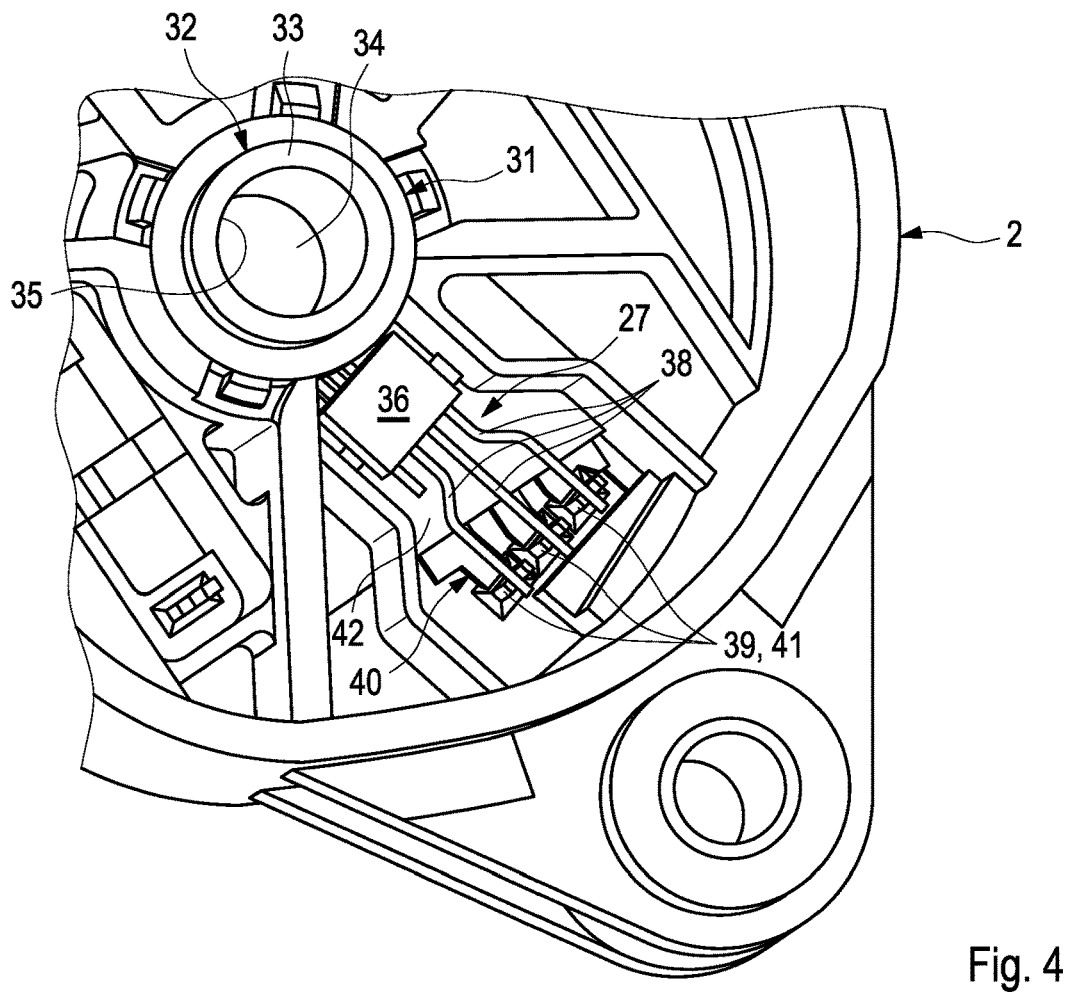
FIG. 4 an isometric view of the housing in the region of a bearing.
Figure 5:
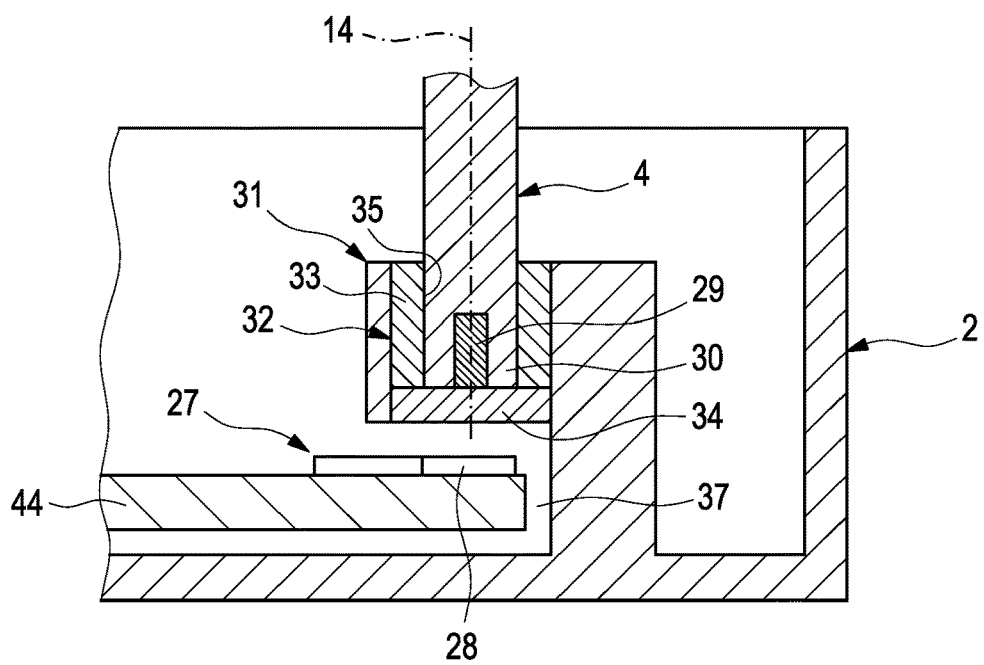
FIG. 5 a greatly simplified longitudinal section of a bearing sleeve of the control device.

According to FIGS. 4 and 5, the control device 1 can be additionally equipped with an angle of rotation sensor 27, which serves for determining a rotary position of the output shaft 4. The angle of rotation sensor 27 comprises a Hall sensor 28 that is likewise evident in FIG. 5 and a permanent magnet 29 that is likewise evident in FIG. 5. The Hall sensor 28 is non-rotatably arranged on the housing 2. The permanent magnet 29 is non-rotatably arranged on the output shaft 4, for example on or in an end 30 located inside that is distant from the end 12 located outside. For the rotatable mounting of the output shaft 4, the housing 2 contains a suitable bearing 31. According to the particular embodiment shown here, the bearing 31 can comprise a bearing sleeve 32. Here, the bearing sleeve 32 comprises a shell 33 and a base 34 and defines a bearing chamber 35. In FIG. 4, the bearing chamber 35 faces the beholder. With its end 30 comprising the permanent magnet 29, the output shaft 4 is inserted into the bearing chamber 35 and rotatably mounted therein about the output axis 14. By contrast, the Hall sensor 28 is arranged below and spaced-apart from the base 34 in a sensor space 37.

According to FIG. 4, the angle of rotation sensor 27 comprises a sensor part 36 on which the Hall sensor 28 is arranged. This sensor part 36 projects, transversely to the output axis 14, laterally into the sensor space 37 in order to thus position the Hall sensor 28 below the permanent magnet 29. For this purpose, the angle of rotation sensor 27 is arranged on a board 44 which likewise extends laterally into the sensor space 37. The board 44 can be a part of the sensor part 36 mentioned before. Likewise, the board 44 can present an alternative solution for positioning the Hall sensor 28.

According to FIG. 4, electrical contacts 38 of the sensor part 36 can now be electrically connected with electrical contacts 39 of a lead frame 40. In the example of FIG. 4, suitable plug contacts 41 are shown. This lead frame 40 is at least partly integrated in a housing wall 42 of the housing 2. In other words, the lead frame 40 is at least partly embedded in a plastic, out of which the housing wall 42 of the housing 2 is produced. In particular, the lead frame 40 can be placed into a suitable injection mould during the injection moulding of the housing 2 and over moulded by the plastic.

Thus, the sensor part 36 is located on an inner side of the housing 2. Practically, the lead frame 40 can lead to an outside of the housing 2 and there comprise electrical connections for electrically contacting the sensor part 36.

By way of FIG. 3, a method for mounting the control device 1 is explained in more detail in the following. Initially, the output shaft 4 with fourth gear wheel 23 non-rotatably arranged thereon is inserted in the housing 2. In the housing 2, a suitable bearing 31 is provided for this purpose. Following this, the electric motor 3 with the worm 16 non-rotatably attached to the driveshaft 8 is inserted in the housing 2. In the housing 2, a suitable motor mounting 43 is formed for this purpose. Following this, the worm wheel 17 and the first gear wheel 18, in particular in the form of the first step-up gear wheel 25, can be fitted to the output shaft 4. Following this, the second gear wheel 19 or the third gear wheel 22, preferentially in the form of the second step-up gear wheel 26, can be fitted onto the intermediate shaft 21. For this purpose, the intermediate shaft 21 is inserted into a corresponding positioning place of the housing 2 beforehand. Following this, a cover or a complementary housing part which can comprise a suitable bearing for the output shaft 4 and a further positioning place for the intermediate shaft 21, can be fitted.

The invention claimed is:

1. A control device for mechanically actuating a component, comprising:
    an electric motor, which comprises a stator and a rotor with a driveshaft;
    an output shaft for directly or indirectly actuating the component;
    a transmission, which drive-connects the driveshaft to the output shaft and which comprises a worm drive with a worm and a worm wheel; and
    a drive axis around which the driveshaft is rotatable and which which is oriented at an angle with respect to an output axis about which the output shaft is rotatable;
    wherein the worm, with respect to the driveshaft, is arranged non-rotatably and meshes with the worm wheel;
    wherein the worm wheel is rotatably arranged on the output shaft and non-rotatably connected to a first gear wheel;
    wherein the first gear wheel is rotatably arranged on the output shaft and meshes with a second gear wheel;
    wherein the second gear wheel is rotatable about an intermediate axis extending parallel to the output axis and is non-rotatably connected to a third gear wheel;
    wherein the third gear wheel is rotatable about the intermediate axis and meshes with a fourth gear wheel;
    wherein the fourth gear wheel is non-rotatably arranged on the output shaft; and
    wherein the worm is arranged between the second gear wheel and the fourth gear wheel.

2. The control device according to claim 1, wherein the worm is geometrically arranged between the output shaft and an intermediate shaft, which extends coaxially to the intermediate axis and on which the second gear wheel and the third gear wheel are arranged.

3. The control device according to claim 1, wherein the worm, seen parallel to the output axis, is arranged between the second gear wheel and the fourth gear wheel and, seen transversely to the output axis, is arranged between the output axis and the intermediate axis.

4. The control device according to claim 1, wherein the drive axis is arranged in the middle between the output axis and the intermediate axis.

5. The control device according to claim 1, wherein an intermediate shaft extending coaxially to the intermediate axis is present, which is non-rotatably arranged and on which the second gear wheel and the third gear wheel are rotatably arranged.

6. The control device according to claim 1, wherein an intermediate shaft extending coaxially to the intermediate axis is present, which is rotatably arranged about the intermediate axis and on which the second gear wheel and the third gear wheel are non-rotatably arranged.

7. The control device according to claim 1, wherein the worm wheel and the first gear wheel are formed by a first step-up gear wheel, on which two gear wheel portions are integrally formed, which have different diameters and/or numbers of teeth and which form the worm wheel and the first gear wheel.

8. The control device according to claim 7, wherein the first step-up gear wheel is rotatably arranged on the output shaft (4).

9. The control device according to claim 1, wherein the second gear wheel and the third gear wheel are formed by a second step-up gear wheel, on which two gear wheel portions are integrally formed, which have different diameters and/or numbers of teeth and which form the second gear wheel and the third gear wheel.

10. The control device according to claim 9, wherein the second step-up gear wheel is rotatably arranged on an intermediate shaft extending coaxially to the intermediate axis.

11. The control device according to claim 1, wherein at least one of:
the first gear wheel and the third gear wheel have a same module; and
the second gear wheel and the fourth gear wheel have a same module.

12. The control device according to claim 11, wherein at least one of:
the first gear wheel and the third gear wheel have a same number of teeth; and
the second gear wheel and the fourth gear wheel have a same number of teeth.

13. The control device according to claim 1, wherein the first gear wheel, the second gear wheel, the third gear wheel and the fourth gear wheel have a same module.

14. The control device according to claim 1, wherein an angle of rotation sensor for determining a rotary position of the output shaft is provided, which comprises a Hall sensor and which interacts with a permanent magnet that is non-rotatably arranged on the output shaft.

15. The control device according to claim 14, wherein:
a bearing sleeve is present, which contains a bearing chamber;
the output shaft is rotatably mounted in the bearing chamber about the output axis with an end comprising the permanent magnet; and
the Hall sensor is arranged in a sensor space spaced apart from the permanent magnet.

16. The control device according to claim 15, wherein the angle of rotation sensor comprises a sensor part comprising the Hall sensor, which, transversely to the output axis, projects into the sensor space, so that the Hall sensor is arranged in the sensor space.

17. The control device according to claim 16, wherein electrical contacts of the sensor part are electrically conductively connected to electrical contacts of a lead frame, which is embedded in a plastic of a housing wall of a housing of the control device.

18. The control device according to claim 17, wherein:
the sensor part is located on an inner side of the housing; and
the lead frame, on an outside of the housing, comprises an electrical connection for electrically contacting the sensor part.

19. The control device according to claim 14, wherein the angle of rotation sensor comprises a board carrying the Hall sensor, the board projecting transversely to the output axis into the sensor space so that the Hall sensor is arranged in the sensor space.

20. The control device according to claim 1, wherein the driveshaft or the worm is radially supported on a housing of the control device in an end region facing away from the electric motor.

21. A method for mounting a control device of claim 1, comprising:
inserting the output shaft with the fourth gear wheel non-rotatably attached thereon, into a housing of the control device;
inserting the electric motor, with the worm non-rotatably attached on the driveshaft, into the housing;
fitting the worm wheel and the first gear wheel non-rotatably connected therewith, onto the output shaft; and
fitting the second gear wheel and the third gear wheel non-rotatably connected therewith, onto an intermediate shaft extending coaxially to the intermediate axis, which is beforehand or afterwards arranged in the housing.

22. The method according to claim 21, wherein:
fitting a cover of the housing, which comprises a bearing for the output shaft and a positioning place for the intermediate shaft.

23. A control device for mechanically actuating a component, comprising:
an electric motor, which comprises a stator and a rotor with a driveshaft;
an output shaft for directly or indirectly actuating the component;
a transmission, which drive-connects the driveshaft to the output shaft and which comprises a worm drive with a worm and a worm wheel; and
a drive axis around which the driveshaft is rotatable and which is oriented at an angle with respect to an output axis about which the output shaft is rotatable;
wherein the worm, with respect to the driveshaft, is arranged non-rotatably and meshes with the worm wheel;
wherein the worm wheel is rotatably arranged on the output shaft and non-rotatably connected to a first gear wheel;
wherein the first gear wheel is rotatably arranged on the output shaft and meshes with a second gear wheel;
wherein the second gear wheel is rotatable about an intermediate axis extending parallel to the output axis and is non-rotatably connected to a third gear wheel;
wherein the third gear wheel is rotatable about the intermediate axis and meshes with a fourth gear wheel;
wherein the fourth gear wheel is non-rotatably arranged on the output shaft; and
wherein the drive axis is arranged in the middle between the output axis and the intermediate axis.

* * * * *